Figure 1:
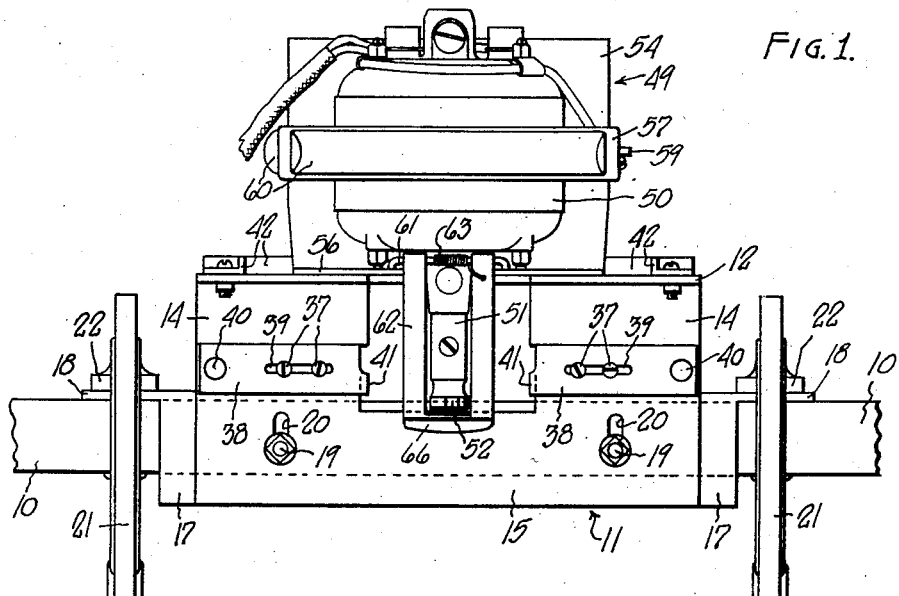

May 9, 1944.  R. B. OGREN  2,348,406
PORTABLE RECESS CUTTER
Filed Aug. 12, 1941  3 Sheets-Sheet 1

INVENTOR.
RUSSELL B. OGREN.
BY Oltsch & Knoblock
Attorneys

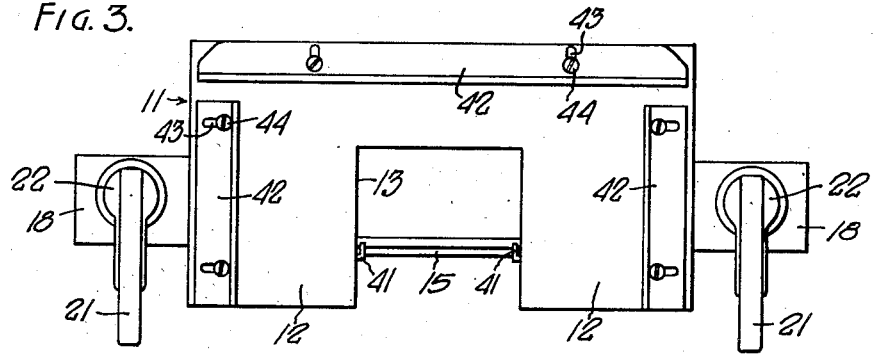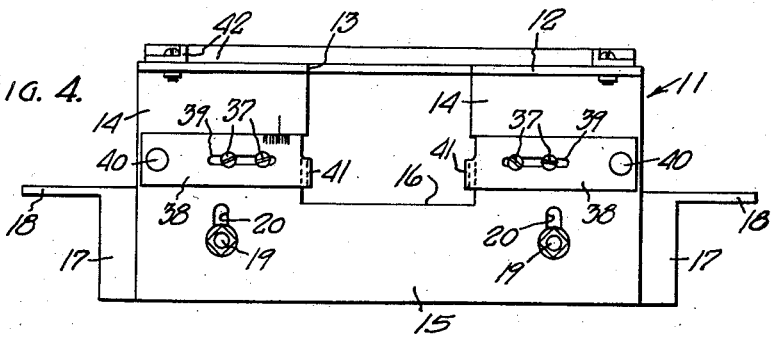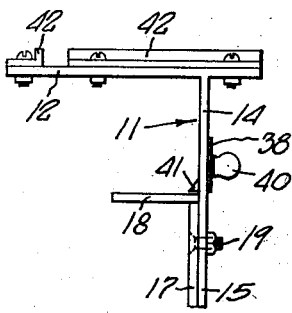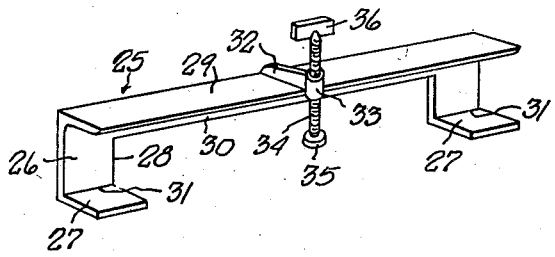

May 9, 1944.  R. B. OGREN  2,348,406
PORTABLE RECESS CUTTER
Filed Aug. 12, 1941  3 Sheets-Sheet 3

INVENTOR.
RUSSELL B. OGREN.
BY Oltsch & Knoblock
Attorneys.

Patented May 9, 1944

2,348,406

UNITED STATES PATENT OFFICE 2,348,406

PORTABLE RECESS CUTTER

Russell B. Ogren, South Bend, Ind.

Application August 12, 1941, Serial No. 406,568

7 Claims. (Cl. 144—27)

This invention relates to a portable recess cutter, and more particularly to a device of this character adapted to cut recesses to receive the plates of hinges in members such as doors and door jambs.

Various devices have been developed heretofore for the purpose of cutting hinge seats, but these have generally been of the type adapted for installation only in factories or other fixed locations to which the work must be brought. An example of these prior devices is the type of machine by which the parts of a cabinet to be hinged together are recessed to receive the hinge plates. Such devices cannot be used by contractors and builders when erecting new buildings, and consequently it has been the general practice of carpenters and finishers to cut seats for door hinges and the like by the use of chisels, saws, and like hand tools. This is difficult work to perform accurately and within reasonable time limits. The construction of trim members, of panel or veneer construction, in which the grain of the various laminations extend in different directions for strength and to avoid warping, account in part for the difficulty and trouble experienced in cutting a recess, by simple hand tools. Because of conditions such as those above mentioned, it is possible for an experienced carpenter or finisher to hang only four or five doors in an average working day.

My invention contemplates the provision of means for simply, accurately, and quickly cutting a recess of this character of the desired size, depth, and shape and in accurate position on the work piece.

In order to achieve this purpose, I provide a guide frame which includes a flat surface plate parallel and spaced from the face of the work piece to be recessed and adapted to slidably support the bearing plate of a cutting unit from which a cutting element projects a distance equal to the desired depth of the recess plus the spacing of the outer or upper face of the surface plate from the face of the work to be recessed.

More particularly, I provide the guide frame with an angle member adapted to bear against the adjacent faces of a work piece at one corner thereof, and with a spacing member adjustably carried by angle members and mounting the surface plate at its upper end. The surface plate is preferably of flat U-shaped form with the free end portions of the legs thereof projecting beyond the edge of the work, so that the bearing plate of the cutting unit may firmly engage the surface plate before the cutting element thereof reaches the work. This assures uniformity of depth of the cut made in the work throughout the full extent thereof. Further, I propose to provide a cutting unit including a motor and an elongated cutting element driven thereby, wherein the motor carries a guide plate perpendicular to the axis of the cutting element and spaced from the outer or cutting end thereof. The guide plate may constitute one web of an angle member which is secured to the motor and which may carry a U-shaped handle member encircling and spaced from the motor. The handle facilitates manipulation of the cutting unit and provides convenient means by which the cutting unit may be shifted upon the surface plate and positively held thereon to insure a cut of uniform depth.

It is also advantageous to provide a guard for the cutting element. Such a guard may be mounted upon the cutting unit by a spring pressed pivot to project parallel to the cutting unit and may terminate in a perpendicularly bent foot portion extending below the end of the cutting element and adapted to engage the work piece. This guard will pivot during the engagement of the cutting unit with a work piece and will always assume a guarding position.

I also contemplate the provision in the guide frame of an opening in the surface plate thereof extending to one edge of said plate through which an elongated cutting element perpendicular thereto may pass freely to engage a predetermined area of the work below said opening. The surface plate may also be provided with guides adjustably mounted thereon adjacent the outer edges thereof for engagement by the edges of the bearing plate of the cutting unit for the purpose of determining the shape and size of the area of the work piece to be cut.

I also contemplate the provision on the guide frame of indexing members positioned adjacent the work engaging portions of the frame to facilitate accurate positioning of the guide frame with respect to the portion of the work to be recessed.

Other objects will be apparent from the description, drawings, and appended claims.

Figure 2:
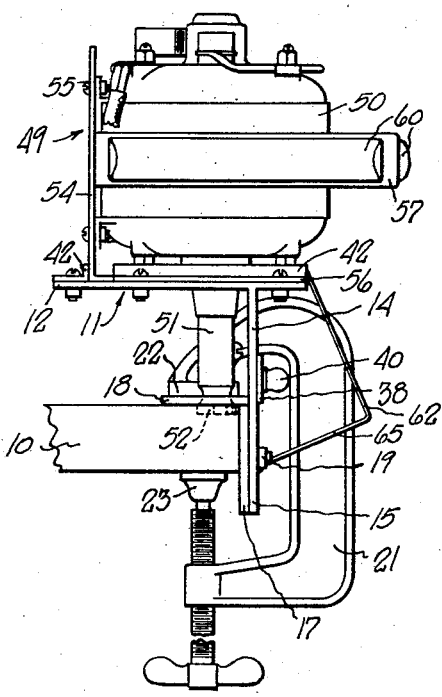
Figure 6:
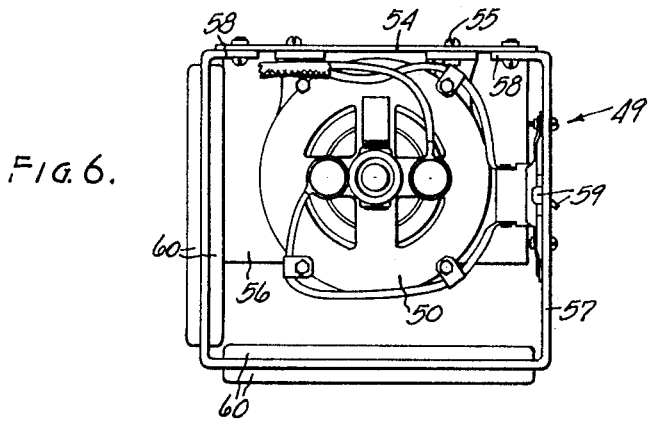
Figure 7:
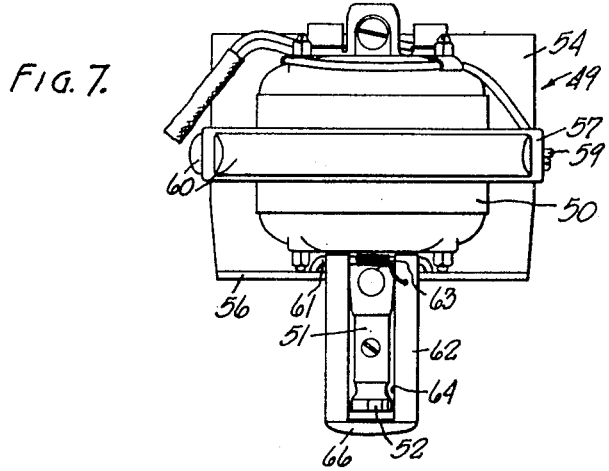
Figure 8:
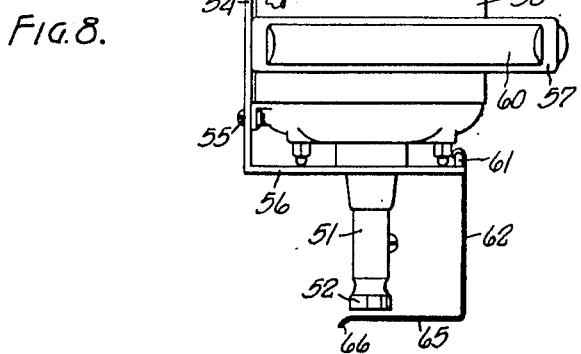

In the drawings:

Fig. 1 is a view of the device in front elevation.
Fig. 2 is a view of the device in end elevation.
Fig. 3 is a plan view of the guide frame.
Fig. 4 is a view of the guide frame in front elevation.
Fig. 5 is an end view of the guide frame.
Fig. 6 is a top view of the cutting unit.
Fig. 7 is a front view of the cutting element.
Fig. 8 is an end view of the cutting element.
Fig. 9 is a perspective view of a clamp member.

Referring to the drawings, which illustrate the preferred embodiment of the device, the numeral 10 designates a work piece which may constitute a door or a door jamb. The guide frame 11 is adapted to be fixedly secured to the work piece 10, and a cutting unit 49 is adapted to be supported by and slid upon frame 11.

Guide frame 11 comprises a rigid flat surface plate 12 of substantially U-shape having a rectangular cut out 13 therein open at one longitudinal side of the surface plate. The surface plate is preferably of substantially rectangular form as illustrated, whereby the edges of the cut out 13 are parallel to the edges of the surface plate adjacent thereto. The leg portions of surface plate 12 are mounted on the upwardly projecting legs 14 of a vertical U-shaped spacing web 15 whose opening 16 communicates with the opening 13 in plate 12. An angle member, having a vertical web 17 and a horizontal web 18, is secured to the lower end of U-shaped spacing web 15 by means of bolts 19 passing through the web 17 and through vertically elongated slots 20 in spacing web 15. The angle member is preferably of greater length than the spacing web 15, and the horizontal flanges or legs 18 of said angle member project beyond the vertical legs 17 thereof. When the inner faces of the webs 17 and 18 of the angle member are positioned in engagement with the faces of a work piece 10 at a corner thereof, suitable clamping means, here illustrated as C-clamps 21, may be employed to fixedly secure the guide frame 11 to the work. As best illustrated in Fig. 2, the foot portion 22 of the frame of the C-clamp may engage the projecting web 18 of the angle member of the guide frame and the foot portion 23 on the screw threaded operating shaft of the clamp may engage the face of the work opposite web 18.

While the use of C-clamps is simple, I have found that time may be saved in mounting frame 11 upon the work by using a separate clamp member 25 as illustrated in Fig. 9. This clamp member preferably comprises a section of channel iron of a width substantially greater than the work and of a length substantially equal to the length of leg portions 18 of the guide frame. The web 26 and one leg 27 of the channel is cut away at 28, thereby providing a long continuous leg 29, a narrow portion 30 of the web, and two foot portions at opposite ends of the unit constituting end portions of the channel leg 27. The inner faces of the web 26 and of the end portions of the channel leg which define inner corner 31 are formed at right angles to each other to permit them to fit snugly against the perpendicular faces of the work piece at a corner thereof. At the center of the continuous leg 29 and transversely thereof extends a rib 32 which is rigidly secured to leg 29 and which includes an enlarged cylindrical end portion 33 projecting laterally beyond the edge of web 29. A screw threaded shaft 34 mounts a foot portion 35 at one end and a hand grip portion 36 at the other end and is threaded through the projecting cylindrical portion 33 of fitting 32. In the use of this clamping member, and assuming that the guide frame has been properly applied to the work piece, 10, the foot portions 27 of the clamping frame will overlie the leg portions 18 of the guide frame, the web 26 will straddle the end of the work and the guide frame 11, and the continuous leg 29 will extend in spaced relation to the work at the side thereof opposite the side which is engaged by the angle member 18. The screw threaded shaft 34 may then be urged inwardly to press the foot 35 against the work. In this way only a single operating member is necessary for the clamping element instead of two separate operable devices where C-clamps are used.

The front or outer face of the vertical spacing web 15 of the guide frame is provided with aligned pairs of horizontally aligned spacing studs 37 in the leg portions 14 thereof. An elongated horizontal index plate 38 having a longitudinally extending elongated slot 39 therein slides on the legs 14 in a horizontal or transverse direction guided by the studs 37 which pass through the elongated slot 39. The outer end of each index plate 38 may carry the knob 40 by means of which the same may be shifted. The sliding movement of the index plates 38 is limited by the length of the slot 39 and the spacing of the studs 37. The index plates 38 are provided with short rearwardly bent pointer portions 41 at their inner ends which terminate adjacent the plane of the inner face of the leg 17 of the guide frame, whereby they extend close to the work piece 10 for accurate juxtaposition to guide markings thereon which are intended to serve to outline the length of the cut to be made in said work piece.

A plurality of angle irons 42 are mounted upon the upper face of surface plate 12 adjacent three marginal edges thereof, as best illustrated in Fig. 3. Each angle iron has transverse elongated slots 43 therein through which bolts 44 extend to secure said angle irons to the surface plate 12 in selected position.

The cutter unit 49 is best illustrated in Figs. 6, 7, and 8, and comprises an electrical motor 50 having an arbor 51 upon the end of which is mounted a cutting element 52. Motor 50 is mounted upon one leg 54 of an angle frame at 55. The other leg 56 of the angle frame extends along one side of the motor and is cut away to permit the arbor 51 to extend therethrough. The leg 56 constitutes a bearing plate adapted to be slidably supported in face engagement upon the surface plate 12 of the guide frame. A U-shaped metal member 57 is secured at its ends 58 to the opposite ends of frame portion 54 intermediate the height thereof. Member 57 extends around the motor 50 in spaced relation thereto and preferably carries a switch 59 by means of which the operation of the motor 50 may be controlled. At two or more sides of the member 57 suitable hand grip portions 60 may be carried by said member.

The outer end of the portion 56 of the frame of the cutting unit is provided with a suitable pivot member 61 to which is pivotally connected a guard member 62 normally extending perpendicular to member 56 and held in this position by a spring 63. The guard plate 62 is preferably provided with an elongated opening 64 through which the cutter 52 may be viewed. At its lower end, the guard 62 is provided with a rearwardly bent foot portion 65 extending below the cutter 52 and terminating at 66 slightly rearwardly of said cutter portion.

It will be obvious that the device is compact and may be mounted within any suitable carrying case, thus making it easy to handle and to transport from place to place, as to and about the site of a construction job. When a door is being hung, the markings for a hinge seat can be made upon the door and upon the jamb, and the guide frame 11 can be then successively clamped to said work pieces, at the precise position of each recess as marked, governed by the index plates 38. The guide frame is clamped to the work so that the surface plate 12 will be spaced from and precisely parallel to the surface of the work piece to be recessed with the leg portions of the surface plate transverse of the work piece. Thereupon, the cutting unit may be placed upon the surface plate and slid thereon, with the cutter 52 and its arbor 51 passing through the cut out 13 in the surface plate and the cut out 16 in the spacing web 15, to freely engage the work. The extension of the surface plate 12 forwardly beyond the work, as best illustrated in Figs. 3 and 5, permits the bearing plate of the cutter unit to engage and have a firm seating thereon before the cutter unit comes into engagement with the work and thus assures that the complete cut will be of uniform depth. It will be observed that the overall length of arbor 51 and the cutter 52 is fixed. Therefore, the depth of the recess to be cut thereby must be controlled by adjustment of the position of the surface plate 12 relative to the work. This is achieved by adjustment of the position of the spacing web 15 upon the angle member 17, 18 which engages the work piece, as is permitted by the elongated slots 20 in member 15 through which the securing means 19 for the said parts passes. Therefore, a definite range for accurate adjustment of the depth of the recess is permitted by the construction. It will be understood that the depth of the recess must be determined by a comparison of the overall dimension between the outer end of the cutter 52 and the bottom surface of the bearing plate 56, as compared to the spacing of the upper edge of the surface plate 12 from the surface of the work piece to be recessed. The size of the recess to be cut is determined by the setting of the angle members 42 upon the surface plate with relation to the size of the bearing plate 56 of the cutter unit. Adjustment of the angle members 42 is accommodated by the provision therein, or in the surface plate, of elongated slots 43 receiving the securing members 44 which interconnect said angle members and surface plate.

The index pointers 41 must be accurately and equally spaced from the edges of the opening 13 in surface plate 12, adjacent thereto. An accurate setting of the frame upon the work guided by the index pointers, together with an accurate setting of each of the end angle members 42 in equi-spaced relation to the adjacent outer edge of the surface plate, assures accuracy of the cut-out made by the device.

The guard member 62 of the cutter unit extends around the cutting element 52 in such a manner as to effectively guard against accidental contact therewith by a workman. This guarding relation continues at all times during use of the device. Thus, it will be observed in Fig. 2 that while the cutter 52 is operating on the work piece 10, the guard 62 remains in a guarding position, even though tilted away from the cutter. It will be observed that the terminal portion 66 of the guard will engage the edge of the work piece 10 under the frame part 15 as the cutter 52 approaches the work, and as the cutter engages and is moved over the work piece perpendicular to the pivot 61, the guard will be pivoted. The movement of the cutter parallel to the length of the work piece is accommodated by sliding of the terminal portion 66 of the guard upon the work piece.

The hand grip frame 57 and the handle portions 60 provide means by which the operator may grasp and hold the cutting unit, to carry the same, to guide the same, and to press downwardly thereon to insure constant face engagement between the bearing plate 56 and the surface plate 12 during operation of the cutter. The mounting of the control switch 59 for the motor 51 upon the handle member 57 constitutes an additional convenience, and assures instantaneous control of the unit by the operator at all times.

It will be understood that the recess which is cut in the work piece by this tool will have rounded rather than square corners. These rounded corners can be squared quickly by the use of hand cutting tools. The squaring operation constitutes the only operation that is necessary to be performed by hand tools. In actual practice, it has been found that this device will so speed and simplify the work of accurately cutting hinge seat recesses and other recesses upon the job that it is possible for an experienced carpenter to hang 15 or more doors per day as compared to the 4 or 5 doors which constitute a day's work for a carpenter using the conventional hand chisel and like tools.

I claim:

1. In a portable recess cutter, a guide frame comprising a pair of interconnected angularly disposed plate portions adapted to engage a work piece at a corner thereof, a spacing plate projecting from said plate portions and a surface plate carried by said spacing plate in spaced parallel relation to one of said first named plates, said angularly disposed plates, surface plate and spacing plate having communicating cut outs therein adapted to receive a cutting element for engagement with the face of said work piece parallel to said surface plate.

2. In a portable recess cutter, a guide frame comprising a flat U-shaped surface plate, a U-shaped spacing member depending from and transverse of intermediate portions of opposite legs of said surface plate, and a bearing plate projecting from an intermediate portion of said spacing member in spaced parallel relation to said surface plate, said bearing plate and the lower end of said spacing member being adapted to engage a work piece at a corner thereof.

3. In a portable recess cutter, a guide frame comprising a flat U-shaped surface plate, a U-shaped spacing web depending from and extending transversely of intermediate portions of opposite legs of said surface plate, an angle member, means for securing said angle member to said web in vertically adjusted position parallel to and spaced from said surface plate, one leg of said angle member extending parallel to said surface plate for engagement with the face of a work piece to be recessed.

4. In a portable recess cutter, a guide frame comprising a flat U-shaped surface plate, a member mounting said plate and including a bearing plate spaced below and parallel to said surface plate and adapted to engage the surface of the work piece to be recessed, said member being cut away in communication with the space between the legs of said surface plate to accommodate passage of a cutting element therethrough into engagement with said work piece.

5. In a portable recess cutter, a guide frame having a bearing portion adapted to engage the surface of a work piece to be recessed and a surface plate spaced from and parallel to said bearing portion, said surface plate having a cut-out therein open at an edge thereof and adapted to receive a cutter, and guide members adjustably mounted on said surface plate and adapted to be engaged by a cutter unit.

6. In a recess cutter, a guide frame comprising a flat U-shaped surface plate, a U-shaped spacing plate whose legs support the legs of said surface plate in perpendicular relation, a bearing plate parallel to said surface plate secured to said spacing plate, an index plate extending transversely of one leg of said spacing plate adjacent said bearing plate, and means for mounting said index plate on said spacing plate for longitudinal sliding adjustment.

7. In a recess cutter, a guide frame comprising a surface plate, a spacing plate supporting said surface plate, a bearing plate projecting from said spacing plate and spaced below and parallel to said surface plate and adapted to be supported on a work piece, said surface and spacing plates having communicating cut-outs therein, the cut-out in said spacing plate extending below the level of said bearing plate and the cut-out in said surface plate extending to an edge thereof, and an index plate carried by said spacing plate adjacent said bearing plate and shiftable toward and from said cut-out in a path parallel to said surface plate.

RUSSELL B. OGREN.